O. M. HAYDEN & G. A. KNOWLES.
STOCK-FEEDERS.

No. 194,819. Patented Sept. 4, 1877.

UNITED STATES PATENT OFFICE.

OSMAN M. HAYDEN AND GEORGE A. KNOWLES, OF LA PORTE CITY, IOWA.

IMPROVEMENT IN STOCK-FEEDERS.

Specification forming part of Letters Patent No. 194,819, dated September 4, 1877; application filed May 21, 1877.

*To all whom it may concern:*

Figure 1:
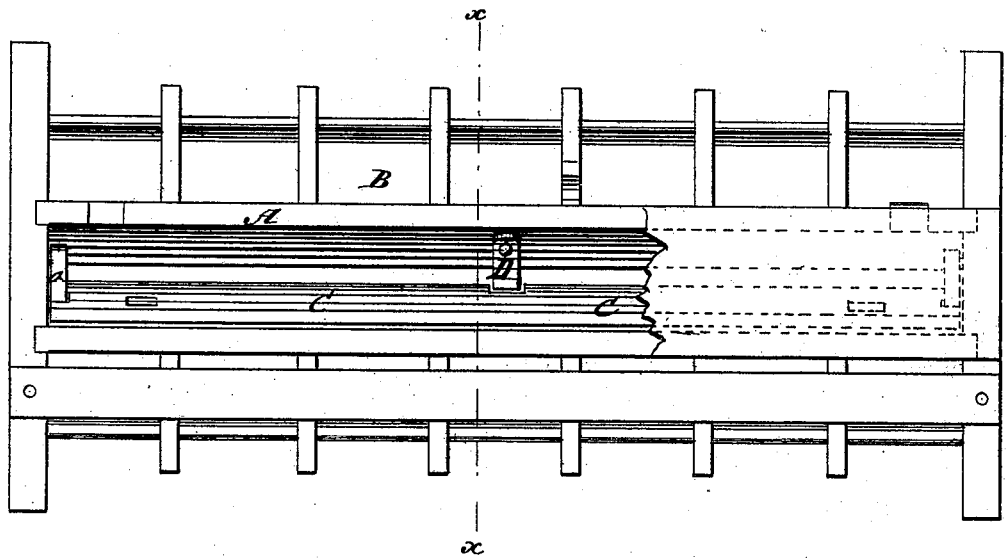
Figure 2:
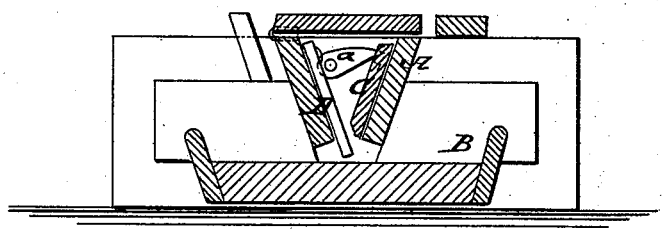

Be it known that we, OSMAN M. HAYDEN and GEORGE A. KNOWLES, of La Porte City, in the county of Black Hawk and State of Iowa, have invented a new and Improved Stock-Feeder, of which the following is a specification:

In the accompanying drawings, Figure 1 represents a top view, and Fig. 2 a vertical transverse section on line $x\ x$, Fig. 1, of our improved stock-feeder.

Similar letters of reference indicate corresponding parts.

This invention is intended for the purpose of feeding ground or other feed to hogs, cattle, sheep, or colts in an economical manner, without deteriorating the feed by impurities or the breath and saliva of the animals, so that other animals are kept from it; and the invention consists of a trough with feed-hopper having adjustable slide-piece and stirring lever or levers.

By referring to the drawings, A represents a hopper, that extends longitudinally throughout the feed-trough B, which is arranged preferably at both sides of the hopper. The trough A is provided with a hinged lid and an interior slide-piece, C, that opens or closes the issuing-opening of the hopper, being adjusted by means of pawls $a$ entering notches or recesses of the slide-piece. The hopper is also provided at the inside with one or more stirrers, D, which may be connected by a rod, for the purpose of agitating the feed in the hopper.

Corn, barley, rye, and other unground feed may be used without the agitating-levers, while ground and fluid feed require stirring.

The feeder may be arranged for different animals by being made of different width and height, forming, however, in all cases an economical feeding-trough, as there is no waste of feed nor soiling of the same by the animals, the feeding being readily interrupted, when one set of animals is fed, by dropping the slide-piece, the next set taking readily the feed as it is delivered in fresh state to them by opening the slide.

The grain is placed in the hopper A after the gage C has been adjusted, and by its own gravity reaches and rests upon the bottom of trough B, finding its way out in small quantities through the bottom slots of trough. The animal, working with its nose and tongue in the effluent grain, moves the lower end of stirrer D, which is thus made to disturb the superposed grain and cause it to flow downward.

Having thus described our invention, we claim as new and desire to secure by Letters Patent—

As an improvement in stock-feeders, the combination of the stirrer D with the gage C, trough B, and hopper A, as shown and described.

OSMAN M. HAYDEN.
GEORGE A. KNOWLES.

Witnesses:
C. T. INGERSOLL,
A. G. PIERCE.